(12) United States Patent
Gu et al.

(10) Patent No.: US 11,929,533 B2
(45) Date of Patent: Mar. 12, 2024

(54) ANION EXCHANGE MEMBRANES FOR REDOX FLOW BATTERIES

(71) Applicant: Evoqua Water Technologies LLC, Pittsburgh, PA (US)

(72) Inventors: George Y. Gu, Andover, MA (US); Savvas Hadjikyriacou, Tyngsboro, MA (US); Michael J. Shaw, Derry, NH (US); Simon P. Dukes, Chelmsford, MA (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 534 days.

(21) Appl. No.: 16/771,278

(22) PCT Filed: Dec. 13, 2018

(86) PCT No.: PCT/US2018/065332
§ 371 (c)(1),
(2) Date: Jun. 10, 2020

(87) PCT Pub. No.: WO2019/118662
PCT Pub. Date: Jun. 20, 2019

(65) Prior Publication Data
US 2020/0381761 A1 Dec. 3, 2020

Related U.S. Application Data

(60) Provisional application No. 62/625,368, filed on Feb. 2, 2018, provisional application No. 62/598,135, filed on Dec. 13, 2017.

(51) Int. Cl.
*H01M 8/18* (2006.01)
*B01J 41/13* (2017.01)
*H01M 8/0245* (2016.01)
(52) U.S. Cl.
CPC ............. *H01M 8/188* (2013.01); *B01J 41/13* (2017.01); *H01M 8/0245* (2013.01)

(58) Field of Classification Search
CPC ......... H01M 8/04074; H01M 8/04708; H01M 8/04716
See application file for complete search history.

(56) References Cited

U.S. PATENT DOCUMENTS 8,906,529 B2 12/2014 Horne et al.
8,969,424 B2 3/2015 Lin
(Continued)

FOREIGN PATENT DOCUMENTS

CN 104703697 A * 6/2015 ........... B01D 61/422
CN 105219060 A * 1/2016
(Continued)

OTHER PUBLICATIONS

KR20150049753A espacenet machine translation Choi et al. (Year: 2015).*
Rype, J-U,"Modeling of Electrically Driven Membrane Process," Technical University of Denmark, Department of Chemical Engineering, a dissertation, pp. 104, 138, Oct. 2002, http://orbit.dtu.dk/fedora/objects/orbit>.
International Search Report, corresponding PCT/US2018/065332, dated Feb. 25, 2020.
(Continued)

*Primary Examiner* — Amanda C. Walke (57) ABSTRACT

A flow battery having at least one rechargeable cell is disclosed. The at least one rechargeable cell can include an anolyte compartment, a catholyte compartment, and an anion exchange membrane positioned between the anolyte and catholyte compartments. The anion exchange membrane can have a thickness of less than 100 μm and a steady state diffusivity of less than 0.4 ppm/hr/cm² with respect to a cation species in an electrolyte of the rechargeable cell. A method of facilitating use of a flow battery including providing the anion exchange membrane is also disclosed. A method of facilitating storage of an electric charge comprising providing the flow battery is also disclosed. A method of producing an anion exchange membrane is also disclosed.

23 Claims, 4 Drawing Sheets

(56) References Cited

U.S. PATENT DOCUMENTS

| | | | |
|---|---|---|---|
| 9,023,902 B2 | 5/2015 | Lin et al. | |
| 10,622,657 B1* | 4/2020 | Kim | H01M 8/1023 |
| 2011/0223450 A1* | 9/2011 | Horne | B60L 53/30 |
| | | | 429/72 |
| 2013/0313118 A1* | 11/2013 | Lin | H01M 8/227 |
| | | | 521/27 |
| 2016/0168346 A1* | 6/2016 | Kamada | C08F 218/08 |
| | | | 429/492 |
| 2016/0308235 A1 | 10/2016 | Reece | |
| 2017/0036171 A1 | 2/2017 | Lienhard et al. | |
| 2019/0148963 A1* | 5/2019 | Nakao | H02J 7/0014 |
| | | | 320/134 |

FOREIGN PATENT DOCUMENTS

| | | | | |
|---|---|---|---|---|
| KR | 20150049753 A | * | 5/2015 | .......... H01M 8/1044 |
| WO | 2010007399 A1 | | 1/2010 | |
| WO | WO-2010133854 A1 | * | 11/2010 | ............ B82Y 30/00 |
| WO | 2011025867 A1 | | 3/2011 | |
| WO | WO-2014195758 A1 | * | 12/2014 | ............ H01M 4/881 |
| WO | 2017147568 A1 | | 8/2017 | |

OTHER PUBLICATIONS

Dlugolecki, P. et al, "Journal of Membrane Science, On the resistances of membrane, diffusion boundary layer and double layer iin ion exchane membrane transport," vol. 349, No. 1-2, pp. 369-370, Mar. 1, 2010; abstract; p. 372, col. 2, first-second paragraph.

Maxwell Technologies, High Voltage Power Grid, Sep. 29, 2017, http://www.maxwell.com/solutions/power-grid-high-voltage; p. 1.

Electropedia< "Electric Vehicle Charging Infrastructure," Apr. 2, 2012, https://www.mpoweruk.com/infrastructure.htm.

Zhao, Y et al., "Advanced Charged Sponge-Like Membrane with Ultrahigh Stability and Selectivity for Vanadium Flow Batteries," Advanced Functional Materials, vol. 26, 2015.

Fumatech WT GMBH, "Redox-Flow-Batteries," Feb. 23, 2017, https://www.fumatech.com/NR/rdonlyres/6E4FA7B9-0AAA-42B9-98E4-BF756C23F981/0/FUMATECH_BWT_GmbHRedoxFlowBatteries.pdf.

Kim et al., "Research Trends in Ion Exchange Membrane Proesses and Practical Applications," Applied Chemical Engineering, 2015, vol. 26, No. 1, pp. 1-16.

* cited by examiner

ANION EXCHANGE MEMBRANES FOR REDOX FLOW BATTERIES

CROSS-REFERENCE TO RELATED APPLICATIONS

This application claims priority under 35 U.S.C. § 119(e) to U.S. Provisional Application Ser. No. 62/598,135, titled "Synthesis of an Anion Ion Exchange Membrane for a Redox Flow Battery Application," filed on Dec. 13, 2017, and U.S. Provisional Application Ser. No. 62/625,368, titled "Tailoring Anion Ion Exchange Membranes for the Application of Redox Flow Batteries," filed on Feb. 2, 2018, each of which is incorporated herein by reference in its entirety for all purposes.

FIELD OF TECHNOLOGY

Aspects and embodiments disclosed herein are generally directed to redox flow batteries, and more specifically, to anion exchange membranes for use in redox flow batteries.

SUMMARY

In accordance with one aspect, there is provided a flow battery. The flow battery may comprise at least one rechargeable cell. The at least one rechargeable cell may include an anolyte compartment, a catholyte compartment, and an anion exchange membrane positioned between the anolyte compartment and the catholyte compartment. The anolyte compartment may be configured to hold a first electrolyte having a first cation species. The catholyte compartment may be configured to hold a second electrolyte having a second cation species. The anion exchange membrane may be configured to be ionically conductive between the first electrolyte and the second electrolyte. The anion exchange membrane may have a thickness of less than 100 μm and a steady state diffusivity of less than 0.4 ppm/hr/cm$^2$ with respect to at least one of the first cation species and the second cation species.

In some embodiments, at least one of the first cation species and the second cation species is a metal ion. At least one of the first cation species and the second cation species may be selected from zinc, copper, cerium, and vanadium.

The anion exchange membrane may have a useful life of at least about 12 weeks, determined when internal potential drop is at least about 2.5 V.

The anion exchange membrane may have a thickness of less than about 55 μm. In some embodiments, the anion exchange membrane may have a thickness of between about 15 μm and about 35 μm. For instance, the anion exchange membrane may have a thickness of about 25 μm.

In some embodiments, the anion exchange membrane may have a steady state diffusivity of less than 0.12 ppm/hr/cm$^2$ with respect to at least one of the first cation species and the second cation species.

The anion exchange membrane may have a resistance of between about 3.0 Ω-cm$^2$ and about 10.0 Ω-cm$^2$ when measured on direct current after equilibrium in a 0.5M NaCl solution at 25° C. The anion exchange membrane may have a resistance of between about 5.0 Ω-cm$^2$ and about 8.0 Ω-cm$^2$ when measured on direct current after equilibrium in a 0.5M NaCl solution at 25° C. In some embodiments, the anion exchange membrane may have a co-ion transport number of at least about 0.95 with respect to at least one non-redox species.

The flow battery may be configured to be compatible with a high voltage direct current (HVDC) transmission line and provide a voltage of between about 1000V and about 800 KV.

The flow battery may be configured to be compatible with an automobile and provide a voltage of between about 100V and about 500V.

In accordance with another aspect, there is provided a method of facilitating use of a flow battery. The method may comprise providing at least one anion exchange membrane and providing instructions to install each anion exchange membrane in a rechargeable cell of the flow battery. The anion exchange membrane may have a thickness of less than 100 μm and a steady state diffusivity of less than 0.4 ppm/hr/cm$^2$ with respect to at least one of a first metal cation species and a second metal cation species. Each anion exchange membrane may be installed between an anolyte compartment and a catholyte compartment.

In accordance with certain embodiments, providing the anion exchange membrane may comprise providing an anion exchange membrane having a thickness of between about 15 μm and about 35 μm.

In accordance with certain embodiments, providing the anion exchange membrane may comprise providing an anion exchange membrane having a steady state diffusivity of less than 0.12 ppm/hr/cm$^2$ with respect to at least one of the first metal cation species and the second metal cation species, the first and second metal cation species independently selected from zinc, copper, cerium, and vanadium.

The method may further comprise providing instructions to charge the flow battery and continuously operate the flow battery.

In accordance with another aspect, there is provided a method of facilitating storage of an electric charge. The method may comprise providing a flow battery and providing instructions to charge the flow battery. The flow battery may comprise a plurality of rechargeable cells. Each cell may comprise an anolyte compartment, a catholyte compartment, and an anion exchange membrane positioned between the anolyte compartment and the catholyte compartment. The anolyte compartment may be configured to hold a first electrolyte having a first cation species. The catholyte compartment may be configured to hold a second electrolyte having a second cation species. The anion exchange membrane may be configured to be ionically conductive between the first electrolyte and the second electrolyte. The anion exchange membrane may have a thickness of less than 100 μm and a steady state diffusivity of less than 0.4 ppm/hr/cm$^2$ with respect to at least one of the first cation species and the second cation species.

The method may further comprise providing instructions to charge the flow battery by electrically connecting the flow battery to a variable energy supply.

The method may further comprise providing instructions to electrically connect the flow battery to a high voltage direct current (HVDC) transmission line.

In some embodiments, the method may further comprise providing instructions to replace at least one of the first electrolyte and the second electrolyte after discharge of the flow battery.

In accordance with another aspect, there is provided a method of producing an anion exchange membrane. The method may comprise integrating a cationic functional monomer having a cross-linking group in a polymerization product and coating a microporous substrate having a thickness of less than about 100 μm with the polymerization product. In some embodiments, the polymerization product may be substantially free of a cross-linking agent.

In accordance with certain embodiments, the microporous substrate may have a thickness of about 25 μm. The microporous substrate may comprise at least one of polypropylene, high molecular weight polyethylene, ultrahigh molecular weight polyethylene, polyvinyl chloride, polyvinylidene fluoride, polysulfone, and combinations thereof. The microporous substrate may have a porosity of between about 25% and about 45% and an average pore size of between about 50 nm and about 10 μm. The microporous substrate may comprise ultrahigh molecular weight polyethylene having a porosity of about 35% and an average pore size of about 200 nm.

The disclosure contemplates all combinations of any one or more of the foregoing aspects and/or embodiments, as well as combinations with any one or more of the embodiments set forth in the detailed description and any examples.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Flow batteries are a class of electrochemical cell. In a typical flow battery, chemical energy may be provided by two liquid electrolytes contained in respective chambers and separated by an ion exchange membrane. Flow of electric current and corresponding ion exchange may occur through the ion exchange membrane while both liquid electrolytes circulate through their chambers. Typically, energy capacity of a flow battery is a function of liquid electrolyte volume, and the power is a function of the surface area of the electrodes.

A flow battery may be operated in two modes. In a first mode, spent electrolyte may be extracted and new electrolyte is added to the system, similar to a fuel cell. The spent electrolyte may be regenerated through a chemical process for further use. In a second mode, an electric power source may be connected to the flow battery for regeneration of the electrolyte, similar to a rechargeable battery.

In accordance with one aspect, there is provided a flow battery. The flow battery may comprise at least one rechargeable cell. In some embodiments, the flow battery may comprise a plurality of rechargeable cells, for example, within a housing. The rechargeable cell may generally include an anolyte compartment, a catholyte compartment, and an ion exchange membrane positioned between the anolyte compartment and the catholyte compartment. Additional electrolyte may be stored externally, for example, in tanks. The additional electrolyte may be pumped through the anolyte compartment or catholyte compartment of the rechargeable cell or cells. In some embodiments, the additional electrolyte may be transferred via a gravity feed system.

Figure 1:
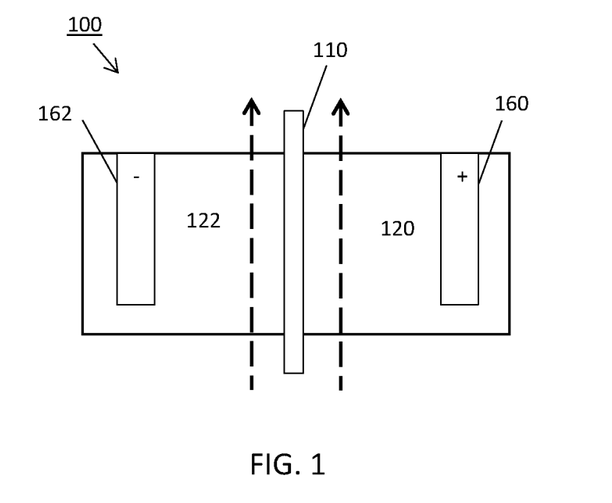
FIG. 1 is a schematic diagram of a rechargeable flow cell, according to one embodiment.

FIG. 1 is a schematic diagram of an exemplary rechargeable flow cell. The exemplary rechargeable flow cell 100 may include an anolyte compartment 120 and a catholyte compartment 122. The anolyte compartment 120 and catholyte compartment 122 may be separated by ion exchange membrane 110. Arrows show the direction of electrolyte flow through the flow cell 100. The flow cell 100 may further include electrodes 160, 162. In some embodiments, the flow cell 100 may include a bipolar electrode positioned between the adjacent anolyte compartment 120 and catholyte compartment 122.

Figure 2:
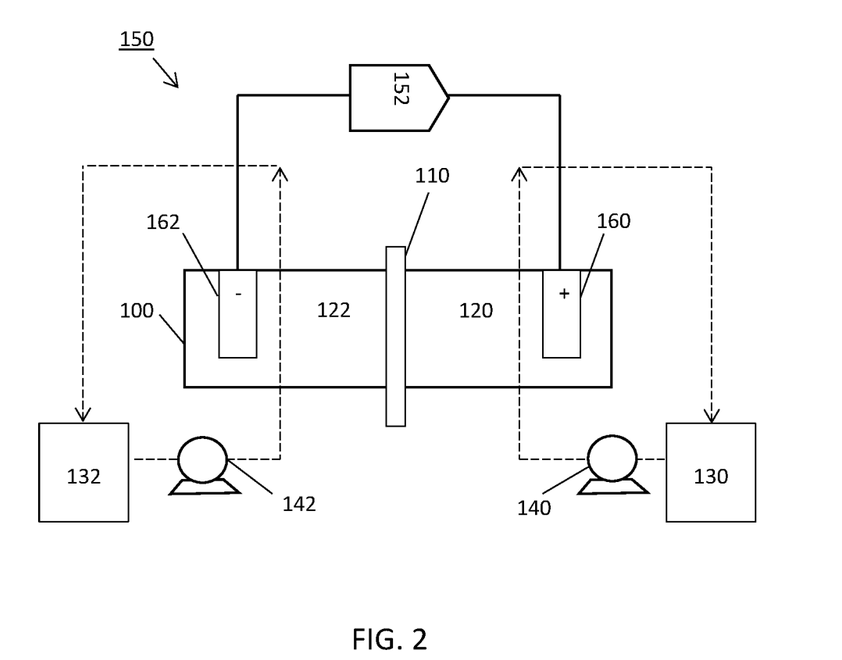
FIG. 2 is a schematic diagram of a flow battery, according to one embodiment.

FIG. 2 is a schematic diagram of an exemplary flow battery 150 including rechargeable flow cell 100. While only one rechargeable flow cell 100 is pictured in FIG. 2, it should be understood that multiple flow cells 100 may generally be included in the flow battery 150. The anolyte compartment 120 and catholyte compartment 122 of the flow cell 100 may be fluidly connected to external anolyte tank 130 and catholyte tank 132, respectively. The flow battery 150 may include pumps 140, 142 to circulate electrolyte. The flow battery 150 may be electrically connectable to a charge source 152. As shown in FIG. 2, electrodes 160, 162 are electrically connected to charge source 152.

Redox flow batteries (RFB) operate by storing energy in two different electrolytes, which are often aqueous in nature. The amount of energy stored may depend on the volume of the two electrolytes. An RFB can be designed to store a specific amount of energy by selecting the electrolyte volume. Such a technology can be useful to store energy from renewable sources that operate intermittently. Another possible application for RFBs is use in electric vehicles. Their use could solve one drawback of battery operated vehicles—the time it takes to recharge the battery—by allowing rapid replacement of spent electrolyte in lieu of recharging.

A typical recharging process may require several hours to fully charge the battery. With a RFB, the electrolytes can quickly be changed out from the vehicle. The discharged electrolyte may be removed and replaced with a fully charged electrolyte. Additionally, since the electrolytes are often in liquid form, it may be possible to "refuel" the RFB vehicle in the same amount of time needed to refuel a traditional gasoline powered vehicle. Once the electrolytes are removed and replaced, the discharged electrolytes may be recharged or regenerated outside the vehicle and for reuse at a later time.

In any of the aforementioned RFB applications, an ion exchange membrane may be required for the electrochemical cell. In certain RFB applications, an anion exchange membrane may be required. The anion exchange membranes described herein are well suited for RFB applications and are not limited to any specific type or application of RFB technology.

RFBs apply an oxidation-reduction reaction to charge and discharge the cell. The RFB typically operates on a redox couple (reductant and oxidant) functioning as a "rocking chair" in an individual electrode compartment during charging and discharging cycles of the flow battery. An ion exchange membrane may be positioned to separate the anolyte and the catholyte. The ion exchange membrane may be selected to prevent energy release by the chemical reaction between the oxidant and reductant, ensuring that electrical energy is delivered to an external load. An exemplary RFB employs zinc and cerium. An example of the charging and discharging electrochemical reaction is shown below:

In this exemplary RFB, the total potential for the battery is 2.203 volts. Such an RFB includes an anolyte comprising zinc ions ($Zn^{2+}$) and a catholyte comprising cerium ions ($Ce^{4+}$).

Figure 3:
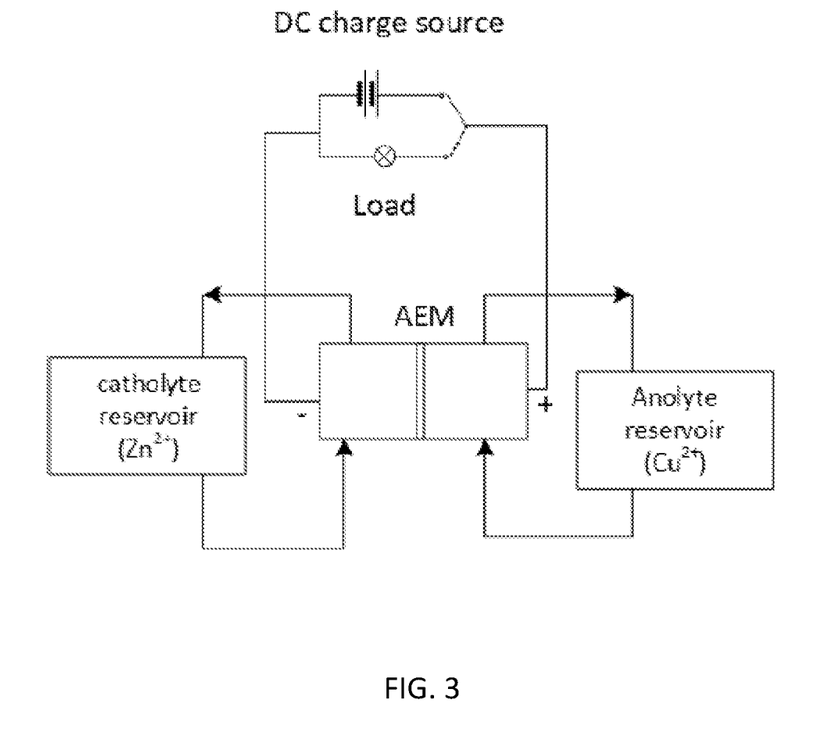
FIG. 3 is a schematic diagram of a zinc-copper redox flow battery, according to one embodiment.

An alternate example of a charging and discharging electrochemical reaction is shown below:

In the exemplary RFB, the total potential for the battery is 1.103 volts. Such an RFB includes a catholyte comprising zinc ions ($Zn^{2+}$) and an anolyte comprising copper ions ($Cu^{2+}$). FIG. 3 is a schematic diagram of a zinc-copper RFB under a charge operation condition. The exemplary RFB is charged by a DC charge source and includes a Zn catholyte external tank and a copper anolyte external tank. The tanks are fluidly connected to respective compartments positioned on opposite sides of the anion exchange membrane.

In accordance with certain embodiments, the rechargeable cell or cells disclosed herein may include first and second electrolytes. Each of the first and second electrolytes may comprise a cation. The cation may generally refer to the redox species needed for an electrode reaction within the flow cell. Each electrolyte may contain redox species as well as non-redox species. Thus, the anolyte compartment may be configured to hold a first electrolyte having a first cation species, while the catholyte compartment may be configured to hold a second electrolyte having a second cation species. In some embodiments, at least one of the cation species is a metal ion. For example, at least one of the cation species may be selected from zinc, copper, cerium, and vanadium.

The cation species may be the same or different. In certain nonlimiting exemplary embodiments, the rechargeable cell may include zinc-cerium, zinc-copper, zinc-zinc, or vanadium-vanadium. Where the same cation species is employed in the anolyte and catholyte, the cation species may have different ionic states. For example, a zinc flow battery may include $Zn^0$ or $Zn^{2-}$. A vanadium flow battery may include $V^{2+}$, $V^{3+}$, $V^{4+}$, and/or $V^{5-}$. Other cations which may be employed include bromine, nickel, iron, and cyanide (for example, ferricyanide).

The exemplary zinc-cerium RFB described above may generally include an anion membrane to allow for anion transfer from the anode to cathode compartment during discharge, and allow for anion transfer from the cathode to anode compartment during the charging. In accordance with certain embodiments, the rechargeable cell disclosed herein may comprise an anion exchange membrane positioned between the anolyte and catholyte compartments. The anion exchange membrane may be configured to be ionically conductive between the electrolytes. In use, the anion exchange membrane may be ionically conductive between the electrolytes. In general, the anion exchange membrane may be ionically conductive between ions not involved in the electrode reaction.

Anion exchange membranes are generally capable of transporting anions under an electrical potential. An anion exchange membrane may have fixed positive charges and mobile anions. Ion exchange membrane properties may be controlled by the amount, type, and distribution of fixed ionic groups within the membrane. Quaternary and tertiary amine functional groups, for example, may produce fixed positive charged groups in strong and weak base anion exchange membranes. Bipolar membranes may include a cation exchange and an anion exchange membrane laminated or bound together, sometimes with a thin neutral layer between.

A polymer electrolyte membrane (PEM) is an ion exchange membrane that is capable of performing both as an electrolyte and as a separator of the anolyte and catholyte. An anionic PEM may contain positively charged groups, for example, sulfonic acid groups and/or amine groups, attached or as part of the polymer making up the PEM. In use, protons or positive ions may generally migrate through the membrane by transferring from one fixed positive charge to another to permeate the membrane.

When selecting a membrane, parameters typically include adequate chemical, thermal, electrochemical, and mechanical stability. Adequate mechanical stability and strength when swollen and under mechanical stress may also be considered. Other parameters may include low resistance, low or preferably no transport of the electrolyte species, and low cost. Development of an ion exchange membrane may include balancing some or all of these properties to overcome competing effects. Ion exchange membranes may be selected to meet certain characteristics, including (1) low electrical resistance to reduce potential drop during operation and increase energy efficiency; (2) high co-ion transport number, for example, high permeability to counter-ions but approximately impermeable to co-ions; (3) high chemical stability, including the ability to withstand any pH from 0 to 14 and oxidizing chemicals; (4) high mechanical strength to withstand the stresses of being handled while being manufactured into a module or other processing device; and (5) good dimensional stability in operation, for instance, adequate resistance to swelling or shrinking when contacting fluid changes concentration or temperature.

In accordance with certain nonlimiting embodiments, an anion membrane for a RFB may be selected to have chemical stability with respect to the battery electrolyte for many cycles, high conductivity to minimize voltage drop during the discharge cycle (including at high amperage operation), and superior selectivity to prevent co-ion transport and maintain the RFB at a high efficiency during its life.

The inventors have recognized that for a given ion exchange membrane, a thinner membrane may generally provide a lower resistance and also allow more membrane area per unit volume of the device. However, thinner membranes may generally be more susceptible to dimensional change from environmental effects, such as changes in ionic concentration or operating temperature of the contacting fluids. In general, it can be more difficult for thinner membranes to be developed and produced without defects because there may be less margin of error during production as compared to thicker membranes where thickness may cover defects that occur during formation.

Thin anion exchange membranes having low resistance, low diffusivity, high co-ion transport number, and good chemical stability can be produced by polymerizing cationic functional monomers having a cross-linking group. As described herein, a composite ion exchange membrane was developed comprising a microporous membrane substrate saturated with a cross-linked polymer having charged ionic groups. Anion exchange membranes disclosed herein may have a thickness of less than 100 μm, a resistance of between about 5.0 Ω-cm² and about 8.0 Ω-cm² when in use, and provide steady state diffusivity of less than 0.4 ppm/hr/cm² with respect to at least one of the cation species. The properties of the ion exchange membrane described herein may generally allow the membrane to operate at a low resistance (high conductance to non-redox species) while not sacrificing integrity of the membrane. While the disclosure generally contemplates anion exchange membranes, it should be understood that similar methods may be performed to produce cation exchange membranes. Namely, where the ionic polymer comprises a relevant functional group.

International Application Publication No. WO/2011/025867, herein incorporated by reference in its entirety, describes a method of producing ion exchange membranes including combining one or more monofunctional ionogenic monomers with at least one multifunctional cross-linking monomer, and polymerizing the monomers in the pores of a porous substrate.

In accordance with one aspect, there is provided a method of producing the ion exchange membrane described herein. The disclosure generally describes the chemistry and materials used for production of an exemplary ion exchange membrane. To produce a cross-linked membrane, the micropores of a substrate may be saturated with a polymerization product comprising a cross-linking functional monomer, followed by polymerizing the monomer in the micropores.

The monomer may comprise a functional group and a cross-linking group. Herein, the term cross-linking group may refer to a monomer substituent or moiety having a polymerization reaction site, which can form networked or cross-linked polymers. The term ionic functional group may refer to a monomer substituent or moiety having a charged group covalently attached. The charged group can be positively charged or negatively charged. The monomers described herein may generally comprise at least one functional group and at least one cross-linking group. In accordance with certain embodiments, the molecules described herein may comprise a hydrocarbon base structure.

The functional cross-linked monomer may provide stability to the membrane. Membrane stability and relative tightness generally depends on the degree of cross-linking with the same monomer. The stability may also depend on the miscibility between the functional group and the cross-linking group. When the two groups are not miscible, typically due to the hydrophobic and hydrophilic natures of the cross-linking group and ionic group respectively, a solvent may be added to produce a polymerization solution. During a thermal polymerization process, the volatile solvent may evaporate, changing the distribution of monomers in solution. The solvent may also change the reactivity of the two groups due to a solvation effect. The result is generally the formation of a block co-polymer instead of an even distribution of monomers.

If the functional monomer is not itself cross-linked, the functional group may risk detachment from the polymer network. When each functional group is cross-linked, the hydrolysis of the ester group only reduces the cross-linking degree, which may reduce the degradation rate of the membrane. Thus, as provided by the functional cross-linking monomers disclosed herein, the monomer may become fully cross-linked, and the functional group may be covalently linked to the polymer backbone of the membrane. The degradation of the membrane may be reduced, resulting in increased chemical stability in electrolyte solution and significantly increasing longevity. Additionally, due to the cross-linking group, the polymerization product may be substantially free of a cross-linking agent.

In certain nonlimiting embodiments, the method may comprise integrating a cationic functional monomer having a cross-linking group in a polymerization product and coating a microporous substrate having a thickness of less than about 100 μm with the polymerization product. The polymerization product may be substantially free of a cross-linking agent. The polymerization product may include a solvent. The polymerization product may include a polymerization initiator.

The functional group may include a positively charged amine group, for example, a quaternary ammonium group. A tertiary amine group may be quaternized with a quaternizing chemical. The quaternary ammonium functional group may be strongly basic and ionized to act over the pH range of 0 to 14, allowing a broad operational range.

The cross-linking group may produce a membrane with a high cross-link density without the addition of an external cross-linking agent. Cross-linking monomers may have at least one polymerization reaction site. In some embodiments, cross-linking monomers may have more than one polymerization reaction site. In some embodiments, the polymer is 100% cross-linked.

The cationic functional monomer may be copolymerized with at least one secondary functional monomer. The secondary functional monomer may be configured or selected to alter ion exchange capability without cross-linking. The secondary functional monomer may be selected from the group including, but not limited to, vinylbenzyltrimethylammonium chloride, trimethylammonium ethylmethacyrlic chloride, methacrylamidopropyltrimethylammonium chloride, (3-acrylamidopropyl) trimethylammonium chloride, 2-vinylpyridine, and 4-vinylpyridine, and one or more polymerization initiators.

The cationic functional monomer may be copolymerized with at least one non-functional secondary monomer. The non-functional secondary monomer may be configured or selected to alter resistivity of the membrane. The non-functional secondary monomer may be configured or selected to alter miscibility of the monomers and/or polymerization product. For instance, the non-functional monomer may be selected for its ability to prevent phase separation caused by the hydrophobic and hydrophilic natures of the cross-linking group and ionic group respectively. Furthermore, copolymerization with the non-functional monomer may allow the polymerization product to remain thoroughly mixed without excess solvent. In some embodiments, the non-functional secondary monomer may be selected from the group including, but not limited to, styrene, vinyl toluene, 4-methylstyrene, t-butyl styrene, alpha-methylstyrene, methacrylic anhydride, methacrylic acid, n-vinyl-2-pyrolidone, vinyltrimethoxysilane, vinyltriethoxysilane, vinyltris-(2-methoxyethoxy)silane, vinylidene chloride, vinylidene fluoride, vinylmethyldimethoxysilane, 2,2,2,-trifluoroethyl methacrylate allyamine, vinylpyridine, maleic anhydride, glycidyl methacrylate, hydroxyethylmethacrylate, methylmethacrylate, or ethylmethacrylate.

In some embodiments, and for certain envisioned uses, a cross-linking agent may be incorporated. Such cross-linking agent may be chosen from, for example, propylene glycol dimethacrylate, isobutylene glycol dimethacrylate, Octavinyl POSS®, Octavinyldimethylsilyi POSS®, Vinyl POSS® mixture, OctaVinyl POSS®, Trisilabolethyl POSS®, Trisilanolisobutyl POSS®, Trisilanolisooctyl POSS®, Octasilane POSS®, Octahydro POSS®, epoxycyclohexyl-POSS® cage mixture, glycidyl-POSS® cage mixture, methacryl POSS® cage mixture, or Acrylo POSS® cage mixture, all distributed by Hybrid Plastics (Hattiesburg, Miss.).

The method may comprise coating the microporous substrate with the polymerization product. The polymerization product may comprise one or more solvents. Solvents which may be incorporated include 1-propanol and dipropylene glycol. Hydroxy containing solvents, such as alcohols (for example, isopropanol, butanol, diols, such as various glycols, or polyols, such as glycerine) may be incorporated in some embodiments. Additionally, aprotic solvents, such as N-methylpyrrolidone and dimethylacetamide, may be incorporated. These solvents are exemplary, and additional or alternative solvents may be apparent to one of ordinary skill in the art.

The polymerization product may include free radical initiators, for example, benzoyl peroxide (BPO), ammonium persulfate, 2,2'-azobisisobutyronitrile (AIBN), 2,2'-azobis (2-methylpropionamidine)dihydrochloride, 2,2'-azobis[2-(2-imidazolin-2yl)propane] dihydrochloride, 2,2'-azobis[2-(2-imidazolin-2-yl)propane], and dimethyl 2,2'-azobis(2-methylpropionate).

The microporous substrate may be selected to have adequate mechanical stability, porosity, and thickness. In accordance with certain embodiments, the microporous substrate may have a thickness of less than 100 µm, a porosity of between about 25% and about 45% and an average pore size of between about 50 nm and about 10 µm. The microporous substrate may comprise at least one of polypropylene, high molecular weight polyethylene, ultrahigh molecular weight polyethylene, polyvinyl chloride, polyvinylidene fluoride, polysulfone, and combinations thereof. These exemplary materials may generally have high mechanical stability at a thickness of 15 µm or greater.

In general, the thickness of the microporous substrate may be as small as feasible while providing adequate mechanical stability to the anion exchange membrane. The thickness of the microporous membrane may be measured without accounting for pore depth. In some embodiments, the microporous substrate may have a thickness of less than about 155 µm. The microporous substrate may have a thickness of less than about 100 µm. The microporous substrate may have a thickness of less than about 75 µm. The microporous substrate may have a thickness of less than about 55 µm. In accordance with certain embodiments, the microporous substrate may have a thickness of about 25 µm. The microporous substrate may have a thickness of about 15 µm, 20 µm, 25 µm, 30 µm, 35 µm, 40 µm, or 45 µm.

The porosity may be selected to enable adequate coating on the substrate while maintaining an adequate mechanical stability. Thus, the porosity may be selected based on coating composition, substrate material, and/or substrate thickness. The porosity, expressed as a percentage, may refer to the volume of the pores with respect to the total volume of the substrate. In some embodiments, the microporous membrane may have a porosity of between about 25% and about 45%. The microporous membrane may have a porosity of between about 20% and 40%. The microporous membrane may have a porosity of about 20%, about 25%, about 30%, about 35%, about 40%, or about 45%. In other embodiments, the porosity may be greater than about 45%. For instance, the porosity may be greater than about 60% or greater than about 70%. In non-limiting exemplary embodiments, the substrate material may be ultrahigh molecular weight polyethylene, the thickness of the substrate may be between about 15 µm and about 35 µm, and the porosity may be selected to be about 35%.

The porosity may also be selected to correspond with a selected average pore size, and vice versa. The average pore size may also be selected based on coating composition and/or substrate material. For instance, the average pore size may be selected to enable a substantially even coating on the substrate. The average pore size may additionally or alternatively be selected to have an effect on membrane performance. Membrane pore size may alter resistance, diffusivity, ion transport number, and tightness of the membrane structure. While not wishing to be bound by any particular theory, it is believed that the selected membrane parameters (pore size, degree of cross-linking, ionic functionality, and thickness, among others) together enable the membrane performance.

In some embodiments, the average pore size may range between about 50 nm and about 10 µm. The average size may from about 100 nm to about 1.0 µm. The average pore size may be from about 100 nm to about 200 nm. The average pore size may be about 100 nm, about 125 nm, about 150 nm, about 175 nm, about 200 nm, about 225 nm, or about 250 nm.

The microporous substrate material may be selected to have adequate mechanical stability at the desired thickness and porosity. In some embodiments, the microporous substrate may comprise at least one of polypropylene, high molecular weight polyethylene, ultrahigh molecular weight polyethylene, polyvinyl chloride, polyvinylidene fluoride, polysulfone, and combinations thereof. These exemplary materials may generally have high mechanical stability at a thickness of 15 µm or greater. Additionally, the exemplary materials may have high mechanical stability at such thicknesses and having a porosity of up to 70%.

The method may further comprise heating the coated microporous substrate or performing the coating step at an elevated temperature. For example, the substrate pore filling or saturation may be performed at a temperature greater than or about 40° C. to reduce air solubility. In some embodiments, the substrate may be coated under a vacuum treatment by submersion in the polymerization solution followed by a heating step.

The method may comprise removing air bubbles after coating the microporous substrate. In some embodiments, a substrate sample may be presoaked and treated to remove air bubbles, for example, by placing on a polyester or similar sheet, covering with a covering sheet, and smoothing out to remove the air bubbles. This process may be performed on a single sheet or in the aggregate.

The polymerization may be performed in a heating unit or on a heated surface. The coated substrate may be placed on a heated surface at a temperature sufficient and for a time sufficient to initiate and complete polymerization. The sufficient time and temperature may generally be dependent on the polymerization product composition. Alternate methods for the polymerization reaction may be employed, for example, treatment with ultraviolet light or ionizing radiation (such as gamma radiation or electron beam radiation).

In accordance with certain embodiments, the methods disclosed herein may significantly reduce production time, for example, by only requiring one coating step. Production time may additionally be reduced by not incorporating a cross-linking agent. Subsequent cross-linking steps may be avoided. Additionally, the produced anion exchange membrane may have a thickness as low as 25 µm or 15 µm while maintaining the desired mechanical strength and chemical stability when in use.

Figure 4:
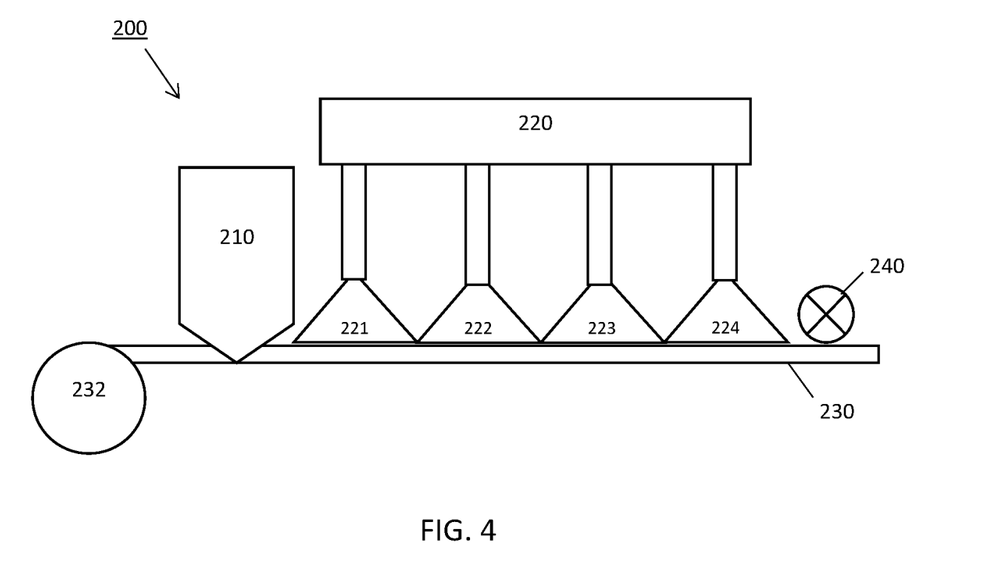
FIG. 4 is a schematic diagram of a membrane production line, according to one embodiment.

The membrane may be produced on a production line as shown in FIG. 4. The exemplary production line 200 of FIG. 4 includes solution tank 210 for coating the membrane substrate. The exemplary production line 200 may move the coated substrate along a heating zone 220 on a mechanical motion element 230. The mechanical motion element may be a conveyer belt 230, optionally including a motor 232. The motor may be operated to control speed along the heating zone 220 (as described in more detail in the examples). The heating zone 220 may include a plurality of heating blocks 221, 222, 223, 224. Here, the exemplary heating zone 220 includes four heating blocks, but the heating zone 220 may include more or less heating blocks. The number of heating blocks may affect the speed of operation of the mechanical motion element 230. The production line 200 may further include a roller 240 for removing air bubbles. In alternate embodiments, the heating zone 220 may be a photo-initiator rather than a thermal-initiator. In some embodiments, the heating zone 220 may include an ultraviolet radiation zone.

Generally, the thickness of the ion exchange membrane may allow lower internal resistance and/or larger power output. The anion exchange membrane thickness may depend on the thickness of the microporous substrate. Thus, the anion exchange membrane may have a thickness of less than about 155 µm. The anion exchange membrane may have a thickness of less than about 100 µm. The anion exchange membrane may have a thickness of less than about 75 µm. The anion exchange membrane may have a thickness of less than about 55 µm. The anion exchange membrane may have a thickness of about 15 µm, 20 µm, 25 µm, 30 µm, 35 µm, 40 µm, or 45 µm.

In some embodiments, the anion exchange membrane may have a thickness of between about 15 µm and about 100 µm. The anion exchange membrane may have a thickness of between about 15 µm and about 75 µm. The anion exchange membrane may have a thickness of between about 15 µm and about 50 µm. The anion exchange membrane may have a thickness of between about 15 µm and about 35 µm. The anion exchange membrane may have a thickness of between about 15 µm and about 25 µm.

The ion exchange membranes described herein may provide superior diffusivity when compared to conventional membranes of a similar thickness. In general, diffusivity may refer to the number of ions crossing a unit area of the ion exchange membrane for a given time. Thus, the membrane diffusivity may be driven by a species concentration difference across the membrane. Steady state diffusivity may refer to a diffusivity whereby flux of ions is essentially constant with time. As disclosed herein, the steady state diffusivity values are measured with respect to at least one of the cation species. Additionally, the steady state diffusivity values can be determined by measuring a sample of the membrane between a 0.4M $CuSO_4$ solution and a 0.5M NaCl solution at 25° C. and monitoring $Cu^{2+}$ in the 0.5M NaCl solution compartment.

In some embodiments, the anion exchange membrane may have a steady state diffusivity of less than 0.4 ppm/hr/$cm^2$ with respect to at least one of the cation species disclosed herein. In some embodiments, the anion exchange membrane may have a steady state diffusivity of less than 0.4 ppm/hr/$cm^2$ with respect to both cation species. The anion exchange membrane may have a steady state diffusivity of less than about 0.3 ppm/hr/$cm^2$, less than about 0.2 ppm/hr/$cm^2$, less than about 0.15 ppm/hr/$cm^2$, less than about 0.12 ppm/hr/$cm^2$, less than about 0.1 ppm/hr/$cm^2$, less than about 0.08 ppm/hr/$cm^2$, less than about 0.05 ppm/hr/$cm^2$, or less than about 0.03 ppm/hr/$cm^2$. Accordingly, the above described diffusivity values are accurate when testing the membrane between a 0.4M $CuSO_4$ solution and a 0.5M NaCl solution at 25° C. and monitoring $Cu^{2+}$ in the 0.5M NaCl solution compartment.

Lower electrical resistance of the membrane may reduce the electrical energy required to operate. Specific membrane resistance is typically reported in Ohm-length (1 cm). However, resistance may not be uniformly distributed along a membrane area. Area membrane resistance is measured in Ohm-area (1 $cm^2$). Area membrane resistance may be measured by comparing electrolyte resistance of a flow cell with the ion exchange membrane to a flow cell without the ion exchange membrane. For instance, cells having two electrodes of a known area (platinum or black graphite may typically be used) in an electrolyte solution may be set up. One cell may have an ion exchange membrane sample of a known area between the electrodes. The electrodes are positioned to not contact the membrane. Membrane resistance may be estimated by subtracting the electrolyte resistance without the membrane from the electrolyte resistance with the membrane in place.

The ion exchange membrane resistance may also be measured by determining a voltage vs. current curve in a cell having two well stirred chambers separated by the membrane. A calomel electrode may be positioned to measure the potential drop across the membrane. The slope of the potential drop may be plotted against the current curve, which may be obtained by varying voltage and measuring current.

Electrochemical impedance may also be used to measure the ion exchange membrane resistance. In this method, alternating current may be applied across the membrane. Measurement at a single frequency generally gives data relating to electrochemical properties of the membrane. By using frequency and amplitude variations, detailed structural information may be obtained.

In some embodiments, the anion exchange membrane may have a resistance of between about 3.0 $\Omega$-$cm^2$ and about 10.0 $\Omega$-$cm^2$ when measured on direct current after equilibrium in a 0.5M NaCl solution at 25° C. The anion exchange membrane may have a resistance of between about 5.0 $\Omega$-$cm^2$ and about 8.0 $\Omega$-$cm^2$ when measured on direct after equilibrium in a 0.5M NaCl solution at 25° C. The anion exchange membrane may have a resistance of between about 6.0 $\Omega$-$cm^2$ and about 7.0 $\Omega$-$cm^2$ when measured on direct current after equilibrium in a 0.5M NaCl solution at 25° C. the resistance may be selected to be as low as possible and determined by the other parameters of the membrane (e.g., material, thickness, etc.) In some embodiments, an ion exchange membrane produced as described herein substantially free of a cross-linking agent may have a lower resistance than an ion exchange membrane produced with a cross-linking agent. The anion exchange membrane may have a resistance of about 3.0 $\Omega$-$cm^2$, about 4.0 $\Omega$-$cm^2$, about 5.0 $\Omega$-$cm^2$, about 5.5 $\Omega$-$cm^2$, about 6.0 $\Omega$-$cm^2$, about 6.5 $\Omega$-$cm^2$, about 7.0 $\Omega$-$cm^2$, about 7.5 $\Omega$-$cm^2$, about 8.0 $\Omega$-$cm^2$, about 9.0 $\Omega$-$cm^2$, or about 10.0 $\Omega$-$cm^2$ when measured on direct current after equilibrium in a 0.5M NaCl solution at 25° C.

Co-ion transport number may generally refer to the relative transport of counterions to co-ions during use of the flow battery. An ideal cation exchange membrane may only permit positively charged ions to pass the membrane, giving a co-ion transport number of 1.0. Co-ion transport number of a membrane can be determined by measuring the potential across the membrane while it separates monovalent salt solutions of different concentrations. The method and calculations used herein are described in more detail in the Examples section.

In some embodiments, the anion exchange membrane may have a co-ion transport number of at least about 0.95 with respect to at least one non-redox species. The non-redox species may include any non-redox species of the electrolyte. The anion exchange membrane may have a co-ion transport number of at least about 0.95 with respect to all non-redox species. The anion exchange membrane may have a co-ion transport number of at least about 0.9, at least about 0.91, at least about 0.92, at least about 0.93, at least about 0.94, at least about 0.95, at least about 0.96, at least about 0.97, at least about 0.98, or at least about 0.99.

The flow cell may additionally include at least one electrode. The power of the flow cell may be a function of the surface area of the electrode. The one electrode may be a bipolar electrode positioned in fluid communication with the first electrolyte and the second electrolyte. The bipolar electrode may be positioned between the first electrolyte and the second electrolyte. The electrodes disclosed herein may be constructed from a corrosion resistant conductive material selected to have adequate electrical, chemical, and mechanical stability in use. The bipolar electrode may comprise a conductive material or a layer of a conductive material. In some embodiments, the bipolar electrode may comprise zinc.

The flow cell may include first and second electrodes, one positioned in each half cell. The first electrode may be positioned in the half cell comprising the first electrolyte while the second electrode may be positioned in the half cell comprising the second electrolyte. The electrodes may include a conductive material or one or more layers of a conductive material. In some embodiments, the electrodes may comprise platinum or black graphite. The flow cell may include at least one separator configured to maintain the ion exchange membrane and the electrode without contacting each other.

The flow battery may comprise a plurality of flow cells. In some embodiments, the flow battery may comprise external electrolyte tanks. The flow battery may be constructed to feed the electrolyte from the tank through the cells, contacting the ion exchange membrane and/or electrode. The flow battery may include one or more pumps configured to circulate electrolyte through the cells. The flow cells may fluidly connected to each other. In some embodiments, the flow cells are not fluidly connected to each other.

In accordance with another aspect, there is provided a method of facilitating use of a flow battery. The method may comprise providing at least one ion exchange membrane as disclosed herein and providing instructions to install the ion exchange membrane in a rechargeable cell of the flow battery. The ion exchange membrane may be an anion exchange membrane. The ion exchange membrane may generally be installed between an anolyte compartment and a catholyte compartment of the rechargeable cell. The method may further comprise providing instructions to charge the flow battery and continuously operate the flow battery.

In some embodiments, the flow battery may be operated for a lifetime of at least about 6 weeks until a replacement or a recharge of the electrolyte is needed. The flow battery may be operated for a lifetime of at least about 12 weeks. In some embodiments, the ion exchange membrane may have a useful life of about 6 weeks, 8 weeks, 10 weeks, 12 weeks, 14 weeks, or 16 weeks. In certain embodiments, the ion exchange membrane may have a useful life of up to about 20 weeks. The useful life of the membrane may be translated to a number of cycles which the membrane may operate before replacement of the electrolyte is needed. In some embodiments, the ion exchange membrane may operate for more than 4000 cycles. For example, the ion exchange membrane may operate for about 4500 cycles, about 5000 cycles, about 5500 cycles, about 6000 cycles, about 6500 cycles, or about 7000 cycles.

As disclosed herein, useful life may refer to the lifetime of the flow battery or ion exchange membrane in continuous use before the electrolyte needs replacing or recharging. In a non-limiting exemplary embodiment, when $Cu^{2+}$ diffuses to the $Zn^{2+}$ compartment (or vice versa $Zn^{2+}$ to the $Cu^{2+}$ compartment), the $Cu^{2+}$ can react with Zn metal formed during discharge. This reaction may convert $Cu^{2+}$ to $Cu^0$, reducing conductivity or increasing voltage at a constant current. Voltage may be a good indicator for the amount of $Cu^{2+}$ diffused through the membrane. Thus, the useful life of the ion exchange membrane may reach a threshold when internal potential drop is high and output is low, indicating the electrolytes may need replacement or recharging. In some embodiments, the useful life of the ion exchange membrane threshold may be reached when internal potential drop is between about 2.0 volts and about 3.0 volts. Useful life of the ion exchange membrane threshold may be reached when the internal potential drop is at least about 2.5 volts. Flow batteries disclosed herein may include a sensor to determine internal potential drop and optionally a user interface to indicate when internal potential drop has reached the useful life threshold.

The useful life of the ion exchange membrane may depend on the membrane's usage. For example, the useful life may vary with electrolyte or electrode material selection. The useful life of the ion exchange membrane may vary with size of the rechargeable cell, electrode, and/or electrolyte compartments. The useful life of the ion exchange membrane may additionally vary with the materials selected. For example, the useful life may vary with coating material, substrate material, and whether the substrate was coated with a cross-linking agent. In general, the ion exchange membrane may have a useful life of between about 6 weeks and about 16 weeks. The method may further comprise providing instructions for determining the useful life of the ion exchange membrane and, optionally, for replacing the electrolyte after expiration. In some extreme circumstances, the method may include replacing the ion exchange membrane after expiration.

In accordance with certain embodiments, the flow battery may be configured to be compatible with a high voltage direct current (HVDC) transmission line. The flow battery may be operated to store electrical energy for use on the HVDC transmission line. In general, such a flow battery may be capable of providing a voltage of between about 1000V and about 800 KV.

In accordance with certain embodiments, the flow battery may be configured to be compatible with an automobile. The flow battery may be operated to store electrical energy for use in an automobile. Such a flow battery may be configured to provide a voltage of between about 100V and about 500V in correspondence with conventional automobile batteries.

In accordance with another aspect, there is provided a method of facilitating storage of an electric charge. The method may comprise providing a flow battery as disclosed herein and providing instructions to charge the flow battery. The flow battery may be charged by connection to an energy supply. In certain embodiments, the flow battery may be charged by connection to a variable energy supply. A variable energy supply may include any energy source that is non-dispatchable due to its fluctuating nature. Examples of variable energy sources include solar power systems, wind power systems, and hydro power systems, such as wave power and tidal power. Other variable energy sources will be readily apparent to one of skill in the art. In general, variable energy sources may include those sources in need of high energy storage to provide continuous operation. Thus, the method may further comprise providing instructions to charge the flow battery by electrically connecting the flow battery to an energy supply, for example, a variable energy supply.

The method may further comprise providing instructions to electrically connect the flow battery to an energy transmission line or directly to a point of use, for example, a consumer. The flow battery may be electrically connected to an HVDC transmission line. The HVDC transmission line may be used for long distance electrical transmission. The HVDC transmission line may further be electrically connected to regional distribution systems, for example, an alternating current (AC) regional system.

In some embodiments, the method may comprise providing instructions to recharge the flow battery after discharge. The flow battery may be discharged and recharged after use for the useful life of the ion exchange membrane. In other embodiments, the method may further comprise providing instructions to replace at least one of the first electrolyte and the second electrolyte after discharge of the flow battery. The electrolyte may be extracted as spent electrolyte and replaced with new electrolyte for a rapid recharge. The spent electrolyte may be regenerated for further use.

The function and advantages of these and other embodiments can be better understood from the following examples. These examples are intended to be illustrative in nature and are not considered to be limiting the scope of the invention. In the following examples, ion exchange membranes having the desired qualities are produced by coating a microporous substrate with a polymerization product.

EXAMPLES

Example 1: Preparation of Test Samples

A laboratory study was performed to design formulation and methods of use of the ion exchange membrane. The laboratory study included producing small coupons of membrane and subjecting them to resistivity and co-ion transport testing.

A porous membrane substrate was die cut into coupons having a 43 mm diameter. Larger discs (50 mm and 100 mm diameter) of transparent polyester sheets were also die cut. A 105 mm aluminum weighing boat was used to hold a set of coupons. The coupons were sandwiched between two polyester film discs.

First, substrate coupons were thoroughly wetted with a monomer solution to make up a test sample. The wetting was performed by adding the formulated solution to the aluminum boat and immersing a polyester film disc with a substrate coupon into the solution until the porous support was saturated. The saturated support was removed from the monomer solution and placed on a piece of polyester film. Air bubbles were removed from the coupon by smoothing or squeezing the coupon. The air bubbles may be removed with a convenient tool, such as a small glass rod, or by hand.

A second polyester disc was layered on top of the first coupon and smoothed to have complete surface contact between the coupon and the lower and upper polyester film layers. A second porous substrate was layered on the upper polyester film and the previous steps (saturation, smoothing, and addition of cover layer of polyester film) were repeated to create a multilayer sandwich of two coupons and three protective polyester film layers.

A typical experimental run would have a multilayered sandwich of 10 or more saturated substrate coupon layers. The rim of the aluminum boat can be crimped down to hold the disc/coupon assembly if required.

The boat and assembly were then placed in a sealable bag. Here, they were placed in a zip-lock polyethylene bag. A low positive pressure of inert gas, here nitrogen, was added before sealing the bag. The bag containing the boat and coupon assembly was placed into an oven at 80° C. for up to about 60 minutes. The bag was then removed and cooled. The now reacted ion exchange membrane coupons were placed in 0.5 M NaCl solution at 40° C.-50° C. for at least 30 minutes, with a soak in NaCl solution of up to 18 hours.

Accordingly, the laboratory membrane coupons are suitable for testing the ion exchange membrane.

Example 2: Preparation of an Anion Exchange Membrane with UHMWPE

Samples were prepared to determine suitability of ultrahigh molecular weight polyethylene (UHMWPE) as a membrane substrate material.

A monomer mixture was integrated into a polymerization product with a solvent, as described herein. A 25 µm thick porous film made from UHMWPE with a porosity of at least 35% and a pore size between 50 nm to 10 µm was saturated in the polymerization product for about 30 to 60 seconds. The saturated film was placed between Mylar® sheets (Dupont Teijin Films, Chester, Va.) to prevent oxygen ingress. The Mylar® sheets were clamped into place and the film was heated to 80° C. for 30 minutes.

A permeability test was performed by placing the membrane in a test cell. A 0.5 M solution of $CuSO_4$ was added on one side of the membrane and A 0.5 M solution of NaCl was added on the opposite of the membrane. Gaskets were used to seal the membrane in the test cell. After four weeks, the NaCl solution had no detectable $CuSO_4$, indicating a non-permeable membrane. The resistivity was measured to be between 5.0 to 8.0 $\Omega\text{-cm}^2$ and the co-ion transport number was measured to be 0.95.

Accordingly, membranes produced with an UHMWPE microporous substrate show non-permeability and suitable resistivity and high co-ion transport number.

Example 3: Preparation of an Anion Exchange Membrane with Polyethylene

Samples were prepared to determine suitability of polyethylene as a membrane substrate material.

A monomer mixture was integrated into a polymerization product with a solvent, as described herein. A 25 µm thick porous polyethylene film obtained from Entek International (Newcastle upon Tyne, United Kingdom) was used as the porous substrate. The porous film had a porosity of about 35% and a pore size about 200 nm (as a reported average value by the vendor). The porous film was dipped in the polymerization product for about 30 to 60 seconds. The saturated film was placed between Mylar® sheets to prevent oxygen ingress. The Mylar® sheets were clamped into place and the film was heated to 80° C. for 30 minutes.

The resistivity and co-ion transport number were measured as in Example 2. The resistivity was measured to be between 5.0 to 8.0 Ω-cm² and the co-ion transport number was measured to be 0.95.

Accordingly, membranes produced with a polyethylene microporous substrate show suitable resistivity and high co-ion transport number.

Example 4: Steady State Diffusivity and Resistance for Exemplary Membranes

Ion exchange membranes prepared as described in Example 2 were tested for diffusivity to $Cu^{2+}$ ions. The membrane was placed between chambers in a two-chamber test cell. The active area for diffusion flux was about 4.5 cm². One chamber contained approximately 100 mL of 0.4 M $CuSO_4$. The other chamber contained approximately 100 mL of 0.5 M NaCl. The chamber containing $CuSO_4$ was slowly stirred by a magnetic stir bar.

The 0.5 M NaCl solution was sampled by UV spectroscopy. The concentration of the $Cu^{2+}$ was determined by absorption of the solution with a 10 mm optical path length quartz cuvette. The instrument was "zeroed" with air as an absorption media. The cuvette was filled with pure 0.5 M NaCl and the absorption was recorded at the vicinity of 246 nm as background adsorption. The 0.5 M NaCl containing diffused $Cu^{2+}$ was then measured by absorption at 246 nm. After the absorption of pure NaCl, the Cu concentration (ppm) was obtained using a standard curve calculated following the procedure described above.

Table 1 lists several membranes prepared using the method described in Example 2, where the reference sample is an AMX membrane (distributed by Astom Corporation, Tokyo, Japan). References 1-4 varied slightly in the polymerization product coated on the substrate.

As shown in Table 1, test membranes 1-4 have a greater resistance than the reference membrane, but test membranes 1-3 have a significantly lower diffusivity than the reference membrane. Additionally, test membranes 1-4 have a smaller thickness than the reference membrane.

Accordingly, test membranes 1-4 are superior to the reference membrane in thickness and diffusivity. Test membranes 1-4 additionally provide suitable resistivity.

TABLE 1

Steady state diffusivity and areal resistance for membrane samples.

| Sample label | 1 | 2 | 3 | 4 | Reference |
|---|---|---|---|---|---|
| Thickness (μm) | 25 | 25 | 25 | 25 | 110 |
| R (Ω-cm²) | 6.6 | 6.85 | 6.44 | 2 | 2.8 |
| Diffusivity (ppm/hr) | 0.543 | 0.339 | 0.332 | 3.39 | 1.81 |
| Diffusivity (ppm/hr/cm²) | 0.120 | 0.075 | 0.073 | 0.753 | 0.402 |

Example 5: Effect of a Cross-Linking Agent on Resistance and Diffusivity

Ion exchange membranes were prepared as described in Example 2. The resistance of the membrane was tested as described in Example 2 to be 6.44 μ-cm².

The polymerization product was modified by adding ethyleneglycol dimethacrylate (EGDM) in varying concentrations. EGDM is an acrylate based cross-linking agent. The addition of EGDM shows a significant change to the resistance and the diffusivity of the membrane as shown in Table 2. The EGDM decreases diffusivity, but significantly increases resistance.

TABLE 2 effect of EGDM on the ion exchange membrane

| Sample | 12.4% EGDM | 15% EGDM | 20% EGDM |
|---|---|---|---|
| R (Ω-cm²) | 6.6 | 8.56 | 10.5 |
| Diffusivity (ppm/hr) | 0.543 | 0.188 | 0.033 |
| Diffusivity (ppm/hr/cm²) | 0.120 | 0.041 | 0.007 |

Accordingly, the addition of a cross-linking agent may generally decrease diffusivity of the membrane. However, the cross-linking agent tends to increase resistivity, in some instances to an unworkable degree.

Example 6: Production of the Ion Exchange Membrane

A polymerization product was prepared as described in Example 2. The polymerization product was added to a laboratory-scale production line. The porous substrate was moved through a polymerization product solution tank and nipped with a pair of nipping roles. Two layers of Mylar® sheets were used to sandwiched to the saturated porous film. The membrane was moved into a heating zone with a total length of 12 feet. The heating zone included four independently controlled heater blocks, each having a length of 3 feet. The membrane production line was operated at a motion speed control for heating time variation capability.

Table 3 lists the membrane properties for varying heating times (motion speed). All 4 zones had a temperature controlled to 120° C.

TABLE 3 ion exchange membrane properties for varying heating times

| Line motion speed (ft/min) | 1 | 2 | 2.5 | 3 |
|---|---|---|---|---|
| Heating time (minutes) | 12 | 6 | 4.8 | 4 |
| R (Ω-cm²) | 11.4 | 7.25 | 7.3 | 6.1 |
| Diffusivity (ppm/cm²-hr) | 0.051 | 0.41 | 0.42 | 0.505 |

Accordingly, membranes produced by a production line may show suitable resistivity and high co-ion transport number.

Example 7: Useful Life of Ion Exchange Membrane

Figure 5:
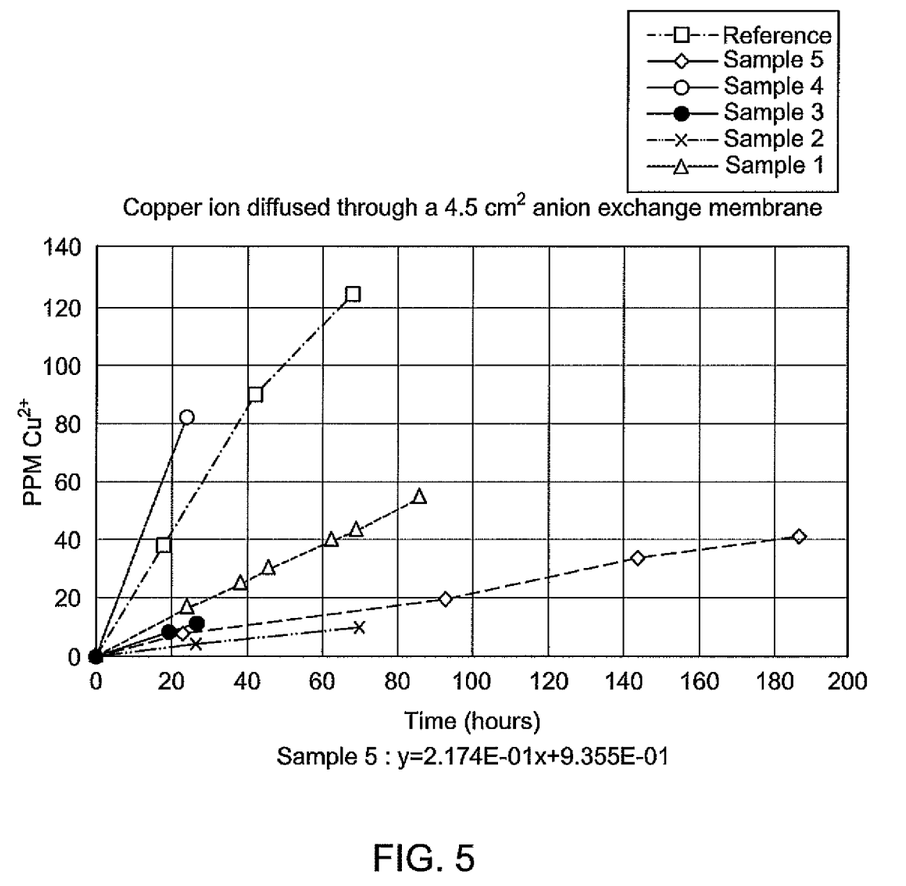
FIG. 5 is a graph of the copper diffusion with time of several sample ion exchange membranes.

Ion exchange membranes prepared as described in Example 2 were tested for $Cu^{2+}$ diffusion through the membrane over time. Test membranes 1-5 were compared to a reference membrane, AMX (distributed by Astom Corporation, Tokyo, Japan). FIG. 5 is a graph of the diffused copper concentration for test membranes 1-5 and the reference membrane over a period of up to about 190 hours.

The initial output (power) for the test membranes was slightly lower than the reference membranes, potentially due to greater resistance of the test membranes (see, e.g., Table 2). The test membranes initially showed a greater internal potential drop (in voltage) but lasted about 6000 cycles before reaching the 2.5 V internal potential drop threshold. The reference membrane lasted about 4000 cycles before reaching the 2.5 V internal potential drop threshold.

With a linear approximation and accounting for the test concentration (0.4 M $CuSO_4$) being approximately half of the concentration of operation, it can be projected that the useful life of the test membranes may be greater than 12 weeks. The useful life of the test membranes may be between about 13 and about 14 weeks. It is believed that with further experimentation, the useful life of the test membranes may be increased.

The examples show that it is possible to produce an ion exchange membrane with superior properties and useful in a flow battery application. The examples also illustrate that it is possible to vary the membrane characteristics based on chemistry modifications.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Having thus described several aspects of at least one embodiment, it is to be appreciated various alterations, modifications, and improvements will readily occur to those skilled in the art. Any feature described in any embodiment may be included in or substituted for any feature of any other embodiment. Such alterations, modifications, and improvements are intended to be part of this disclosure and are intended to be within the scope of the invention. Accordingly, the foregoing description and drawings are by way of example only.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed.

What is claimed is:

1. A flow battery comprising:
    at least one rechargeable cell including an anolyte compartment configured to hold a first electrolyte having a first cation species;
    a catholyte compartment configured to hold a second electrolyte having a second cation species; and
    an anion exchange membrane positioned between the anolyte compartment and the catholyte compartment, configured to be ionically conductive between the first electrolyte and the second electrolyte, the anion exchange membrane formed from a microporous substrate having a thickness of less than 100 µm and a monomer having a cationic functional group and a cross-linking group polymerized to a surface of the microporous substrate, and the anion exchange membrane being fully cross-linked and having a steady state diffusivity of less than 0.4 ppm/hr/$cm^2$ with respect to at least one of the first cation species and the second cation species.

2. The flow battery of claim 1, wherein at least one of the first cation species and the second cation species is a metal ion.

3. The flow battery of claim 2, wherein at least one of the first cation species and the second cation species is selected from zinc, copper, cerium, and vanadium.

4. The flow battery of claim 3, wherein the anion exchange membrane has a useful life of at least about 12 weeks, determined when internal potential drop is at least about 2.5 V.

5. The flow battery of claim 1, wherein the anion exchange membrane has a thickness of less than about 55 µm.

6. The flow battery of claim 5, wherein the anion exchange membrane has a thickness of between about 15 µm and about 35 µm and the microporous substrate comprises ultrahigh molecular weight polyethylene.

7. The flow battery of claim 6, wherein the anion exchange membrane has a thickness of about 25 µm.

8. The flow battery of claim 7, wherein the anion exchange membrane has a steady state diffusivity of less than 0.12 ppm/hr/$cm^2$ with respect to at least one of the first cation species and the second cation species.

9. The flow battery of claim 1, wherein the anion exchange membrane has a resistance of between about 3.0 $\Omega$-$cm^2$ and about 10.0 $\Omega$-$cm^2$ when measured on direct current after equilibrium in a 0.5M NaCl solution at 25° C.

10. The flow battery of claim 9, wherein the anion exchange membrane has a resistance of between about 5.0 $\Omega$-$cm^2$ and about 8.0 $\Omega$-$cm^2$ when measured on direct current after equilibrium in a 0.5M NaCl solution at 25° C.

11. The flow battery of claim 10, wherein the anion exchange membrane has a co-ion transport number of at least about 0.95 with respect to at least one non-redox species.

12. The flow battery of claim 1, configured to be compatible with a high voltage direct current (HVDC) transmission line and provide a voltage of between about 1000V and about 800 KV.

13. The flow battery of claim 1, configured to be compatible with an automobile and provide a voltage of between about 100V and about 500V.

14. A method of facilitating use of a flow battery, comprising:
    providing at least one anion exchange membrane formed from a microporous substrate coated with a monomer having a cationic functional group and a cross-linking group polymerized to a surface of the microporous substrate, the anion exchange membrane being fully cross-linked and having a thickness of less than 100 µm and a steady state diffusivity of less than 0.4 ppm/hr/$cm^2$ with respect to at least one of a first metal cation species and a second metal cation species; and
    providing instructions to install each anion exchange membrane in a rechargeable cell of the flow battery, between an anolyte compartment and a catholyte compartment.

15. The method of claim 14, wherein providing the anion exchange membrane comprises providing an anion exchange membrane having a thickness of between about 15 μm and about 35 μm comprising ultrahigh molecular weight polyethylene.

16. The method of claim 15, wherein providing the anion exchange membrane comprises providing an anion exchange membrane having a steady state diffusivity of less than 0.12 ppm/hr/cm$^2$ with respect to at least one of the first metal cation species and the second metal cation species, the first and second metal cation species independently selected from zinc, copper, cerium, and vanadium.

17. The method of claim 16, further comprising providing instructions to charge the flow battery and continuously operate the flow battery.

18. A method of facilitating storage of an electric charge, comprising:

providing a flow battery comprising a plurality of rechargeable cells, each rechargeable cell including:
  an anolyte compartment configured to hold a first electrolyte having a first cation species;
  a catholyte compartment configured to hold a second electrolyte having a second cation species; and
  an anion exchange membrane positioned between the anolyte compartment and the catholyte compartment, configured to be ionically conductive between the first electrolyte and the second electrolyte, the anion exchange membrane formed from a microporous substrate coated with a monomer having a cationic functional group and a cross-linking group polymerized to a surface of the microporous substrate, the anion exchange membrane being fully cross-linked and having a thickness of less than 100 μm and a steady state diffusivity of less than 0.4 ppm/hr/cm$^2$ with respect to at least one of the first cation species and the second cation species; and providing instructions to charge the flow battery.

19. The method of claim 18, further comprising providing instructions to charge the flow battery by electrically connecting the flow battery to a variable energy supply.

20. The method of claim 18, further comprising providing instructions to electrically connect the flow battery to a high voltage direct current (HVDC) transmission line.

21. The method of claim 20, further comprising providing instructions to replace at least one of the first electrolyte and the second electrolyte after discharge of the flow battery.

22. A flow battery comprising:
at least one rechargeable cell including
  an anolyte compartment configured to hold a first electrolyte having a first cation species;
  a catholyte compartment configured to hold a second electrolyte having a second cation species; and
  an anion exchange membrane positioned between the anolyte compartment and the catholyte compartment, configured to be ionically conductive between the first electrolyte and the second electrolyte, the anion exchange membrane formed from a microporous substrate having a thickness of less than 100 μm and a monomer having a cationic functional group and a cross-linking group polymerized to a surface of the microporous substrate and cross-linked without a cross-linking agent, and the anion exchange membrane having a steady state diffusivity of less than 0.4 ppm/hr/cm$^2$ with respect to at least one of the first cation species and the second cation species.

23. The flow battery of claim 22, wherein the anion exchange membrane is fully cross-linked.

* * * * *